US009461882B1

United States Patent
Jenkins

(10) Patent No.: US 9,461,882 B1
(45) Date of Patent: Oct. 4, 2016

(54) GESTURE-BASED NETWORK CONFIGURATION

(71) Applicant: Western Digital Technologies, Inc., Irvine, CA (US)

(72) Inventor: Dean M. Jenkins, La Canada-Flintridge, CA (US)

(73) Assignee: Western Digital Technologies, Inc., Irvine, CA (US)

(*) Notice: Subject to any disclaimer, the term of this patent is extended or adjusted under 35 U.S.C. 154(b) by 480 days.

(21) Appl. No.: 13/869,820

(22) Filed: Apr. 24, 2013

Related U.S. Application Data

(60) Provisional application No. 61/807,658, filed on Apr. 2, 2013.

(51) Int. Cl.
G06F 3/048 (2013.01)
H04L 12/24 (2006.01)
G06F 3/0488 (2013.01)
G06F 3/0484 (2013.01)

(52) U.S. Cl.
CPC ......... H04L 41/0803 (2013.01); G06F 3/0484 (2013.01); G06F 3/0488 (2013.01)

(58) Field of Classification Search
CPC . G06F 3/0484; G06F 3/0488; H04L 41/0803
USPC .......................................... 715/234; 345/173
See application file for complete search history.

(56) References Cited

U.S. PATENT DOCUMENTS

| | | | |
|---|---|---|---|
| 5,884,033 A * | 3/1999 | Duvall et al. ................. | 709/206 |
| 6,956,562 B1 * | 10/2005 | O'Hara et al. ................ | 345/173 |
| 2003/0123465 A1 * | 7/2003 | Donahue ....................... | 370/401 |
| 2004/0150916 A1 * | 8/2004 | Rao et al. ................... | 360/235.8 |
| 2005/0060412 A1 * | 3/2005 | Chebolu ............. | G06F 9/44505 709/227 |
| 2006/0150240 A1 * | 7/2006 | Robinson ............ | H04L 63/0263 726/4 |
| 2007/0150916 A1 * | 6/2007 | Begole .................. | H04H 60/31 725/10 |
| 2010/0299735 A1 * | 11/2010 | Jiang ..................... | G06F 21/305 726/7 |
| 2012/0317503 A1 * | 12/2012 | Noh ..................... | G06F 3/04883 715/760 |
| 2013/0018967 A1 | 1/2013 | Gannu et al. | |
| 2013/0117105 A1 * | 5/2013 | Dyor et al. ................ | 705/14.52 |
| 2013/0321340 A1 * | 12/2013 | Seo et al. ...................... | 345/174 |
| 2014/0278992 A1 * | 9/2014 | Roundtree ......... | G06Q 30/0257 705/14.55 |

* cited by examiner

Primary Examiner — William Bashore
Assistant Examiner — Gregory A Distefano
(74) Attorney, Agent, or Firm — Chang & Hale LLP

(57) ABSTRACT

Embodiments of a gesture-based network configuration system are disclosed, wherein the system is configured to update a configuration setting on a networking device. The system pairs a computing device to the networking device which is operating a local area network (LAN). A first touch gesture indicating a target uniform resource locator (URL) is received on a touch screen of the computing device. In response to the first touch gesture, a configuration message including a command associated with the first touch gesture and the target URL is transmitted to the networking device. In one embodiment, receiving the configuration message causes the networking device to modify the configuration setting based at least partly on the command and the target URL. In one embodiment, modifying the configuration setting modifies the packet processing behavior of the networking device for data packets associated with the LAN.

18 Claims, 5 Drawing Sheets

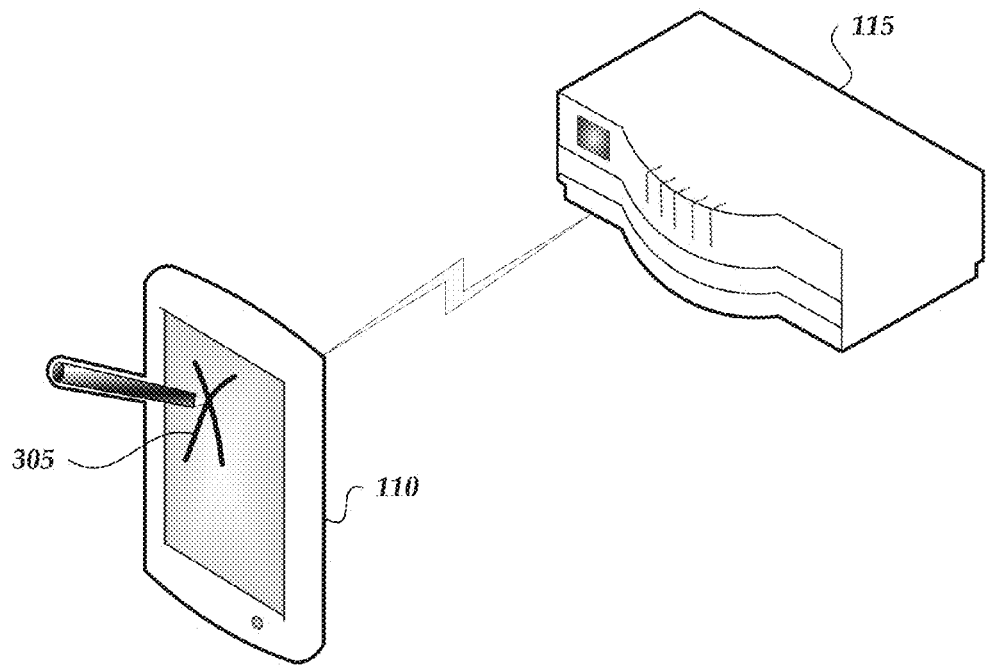
*Fig. 3A*
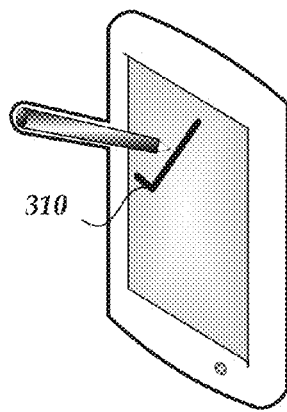 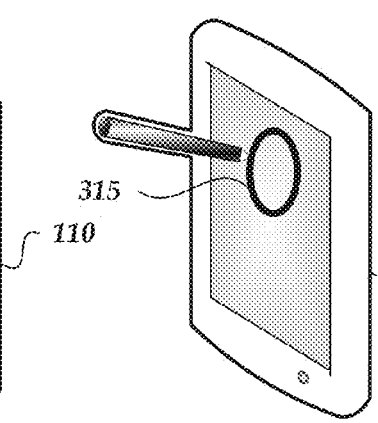 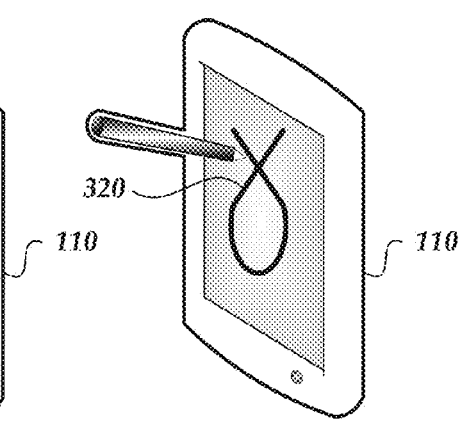
*Fig. 3B*   *Fig. 3C*   *Fig. 3D*

GESTURE-BASED NETWORK CONFIGURATION

CROSS-REFERENCE TO RELATED APPLICATIONS

This application claims priority to U.S. Provisional Application No. 61/807,658, entitled "GESTURE-BASED NETWORK CONFIGURATION," filed Apr. 2, 2013, which is herein incorporated by reference in its entirety.

BACKGROUND

As more and more devices have network connections, the number of connected devices on local networks has increased greatly. For example, a local network on a home could have multiple TVs streaming video, game devices playing online games, computing devices browsing the network, and/or storage devices backing up data or performing other data services. With multiple devices operating on a local network, more and more people, who do not necessarily have a background in networking, have to administer routers and/or other network devices that provide connectivity for these multiple devices.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 3A-3D schematically illustrates embodiments of unique gestures that can be used by the GBNC system to initiate updates.

DETAILED DESCRIPTION

Many routers have the ability to "blacklist" Uniform Resource Locators (URLs), where access to specified URLs are blocked from a local area network (LAN) administered by a particular router. However, creating the blacklist or modifying other configuration settings of a router can be difficult for a user. For example, a user may have to login to the router, find the appropriate menu and/or sub-menu, and determine the proper procedures on how to add a URL to the blacklist. Therefore, providing a system that allows simplified network configuration would be beneficial to users.

Embodiments of a gesture-based network configuration system (GBNC) are disclosed, wherein the system is configured to update a configuration setting on a networking device. The system pairs a computing device to the networking device which is operating a local area network (LAN). A first touch gesture indicating a target uniform resource locator (URL) is received on a touch screen of the computing device. In response to the first touch gesture, a configuration message including a command associated with the first touch gesture and the target URL is transmitted to the networking device. In one embodiment, receiving the configuration message causes the networking device to modify the configuration setting based at least partly on the command and the target URL. In one embodiment, modifying the configuration setting modifies the packet processing behavior of the networking device for data packets associated with the LAN.

In one embodiment, an application or other functional module is provided on a touch-enabled computing device, such as a tablet, laptop, PC or smart phone, which is configured to recognize a unique gesture (e.g., an "X" mark) on top of a website, advertisement or other content associated with a URL and then automatically insert the URL into an associated router's blacklist (or otherwise auto-initiate a change to a configuration setting on the associated router). Likewise an "O" or other unique gesture can remove the URL from the blacklist. Additionally, in some embodiments, the computing device is able to automatically update or otherwise modify other types of configuration settings on the router or other network device using a touch based interface.

Various aspects of the GBNC system will now be described with regard to certain examples and embodiments, which are intended to illustrate but not to limit the disclosure. Nothing in this disclosure is intended to imply that any particular feature or characteristic of the disclosed embodiments is essential. The scope of protection of certain inventions is defined by the claims.

Figure 1:
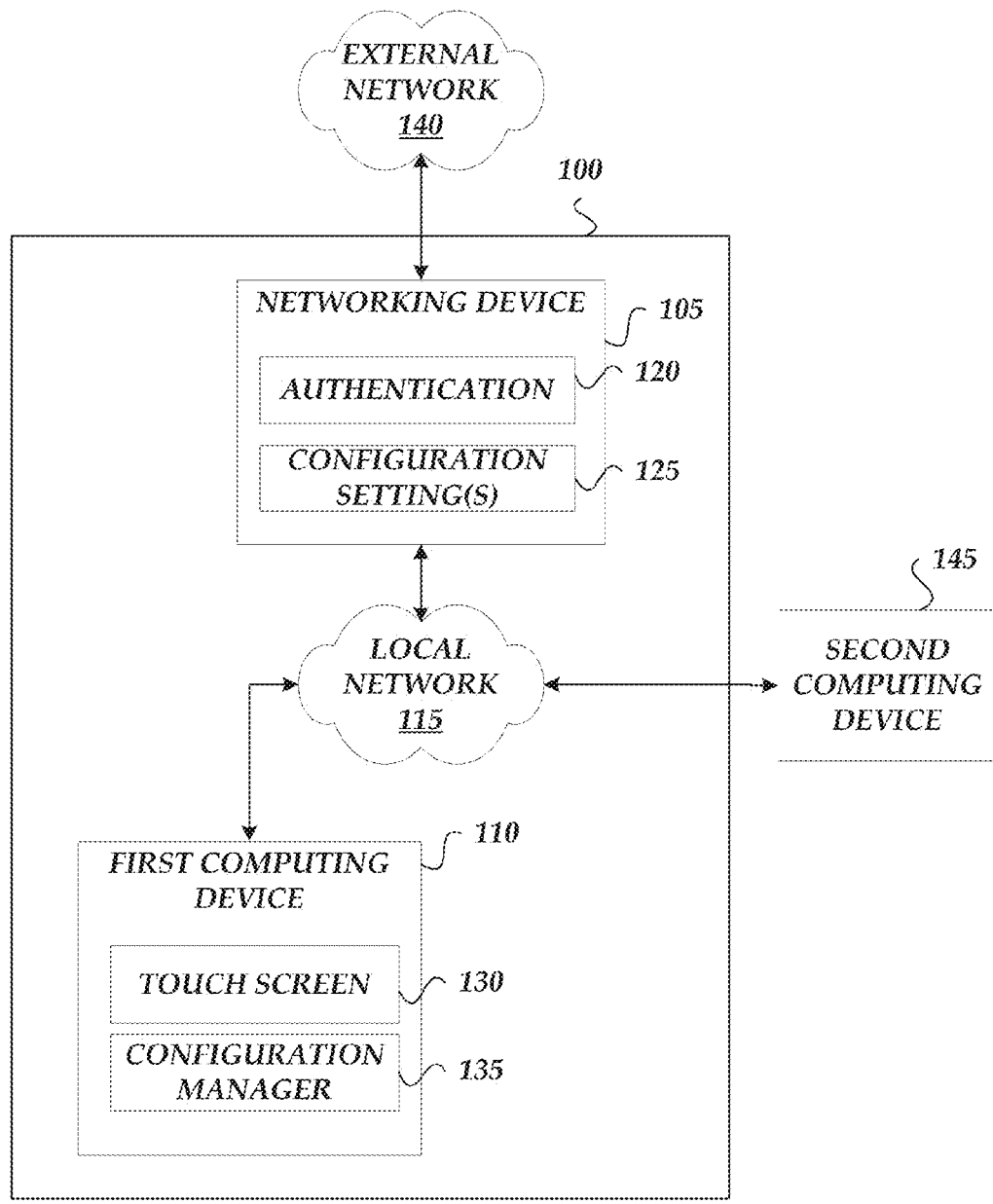
FIG. 1 illustrates a block diagram of an embodiment of a gesture-based network configuration (GBNC) system that provides for simplified networking device configuration.

FIG. 1 illustrates a block diagram of an embodiment of a gesture-based network configuration system that provides for simplified networking device configuration. In the embodiment of FIG. 1, the GBNC system 100 includes a networking device 105 (e.g., a router, gateway, switch, modem, access point, etc.) and a first computing device 110 connected over a local network 115 (e.g., LAN). In one embodiment, the networking device 105 includes an authentication module for verifying access rights of connecting devices/users and one or more configuration settings. Configuration settings can include lists of blocked sites (e.g., a blacklist), lists of allowed sites (e.g., a walled garden or whitelist), network traffic priority settings (e.g., Quality of Service (QoS) settings), and/or other settings that affect packet processing performed by the networking device 105.

In one embodiment, the first computing device 110 (e.g., a laptop, PC, tablet, smartphone, media device, smart display or the like) includes a touch screen 130 and a configuration manager 135 for identifying user input and translating that input into configuration setting changes. The first computing device 110 can also include one or more communication interfaces, such as for Wi-Fi, Ethernet, Bluetooth, or the like for communicating over the local network 115 and/or an external network 140 (e.g., the Internet). In one embodiment, the configuration manager 135 comprises an application or a background process that monitors user input while the user is interacting with other applications, such as a web browser. For ease of explanation, the following describes actions performed by the first computing device 110, but such actions may be performed by specific applications or processes operating on the first computing device, such as the configuration manager 135.

In one embodiment, the first computing device 110 can pair with an associated router or other networking device 105. For example, the first computing device can discover a router on the network (e.g., using a network discovery protocol) and then attempt to connect or otherwise associate with the router. The first computing device may prompt the user to input authentication data that may be required by the networking device 105, such as security keys (e.g., for wireless encryption) and/or login and password information. The device 110 can then store these authentication data to allow the first computing device 110 to automatically access the networking device 105 in the future, without requiring the user to re-enter the authentication data. The first computing device may request confirmation from the user, before performing a configuration setting update.

In some embodiments, the first computing device has a limited access account with the router, such that the first computing device can only affect selected configuration setting(s), while being unable to change other aspects of the router. Such a feature can be useful in limiting the changes that can be made to the router, in the case that someone else gains access to the first computing device.

After the first computing device 110 has paired with the associated router, the first computing device can then begin updating a configuration setting 125 (e.g., a blacklist) on the router as needed. For example, a user may be using the first computing device to browse the Internet, but then sees an undesired advertisement or undesired website (e.g., a popup or pop-under). The user can then make a unique gesture (e.g., over the undesired content) on the touch interface of the first computing device to indicate that the user wants that content to be blocked. The configuration manager 135 operating on the first computing device can then recognize that gesture and communicate with the router to update the configuration setting. For example, the first computing device can send the URL of the undesired content to the networking device 105, which then adds the URL to the networking device's configuration setting (of which there may be several for different functionalities). In one embodiment, as the first computing device is already paired with the associated router, the user does not need to login to the router. Rather, the configuration setting update is handled automatically by the first computing device and the router, in response to the gesture from the user.

When the user (or other users) next attempts to access a blocked URL, using the first computing device 110 or a second computing device 145 on the LAN, the networking device will block the content. For example, if a parent decided to block content using the first computing device 110, that content would be blocked on their children's computing devices (e.g., the second computing device 145, which may or may not be touch-enabled).

Figure 4:
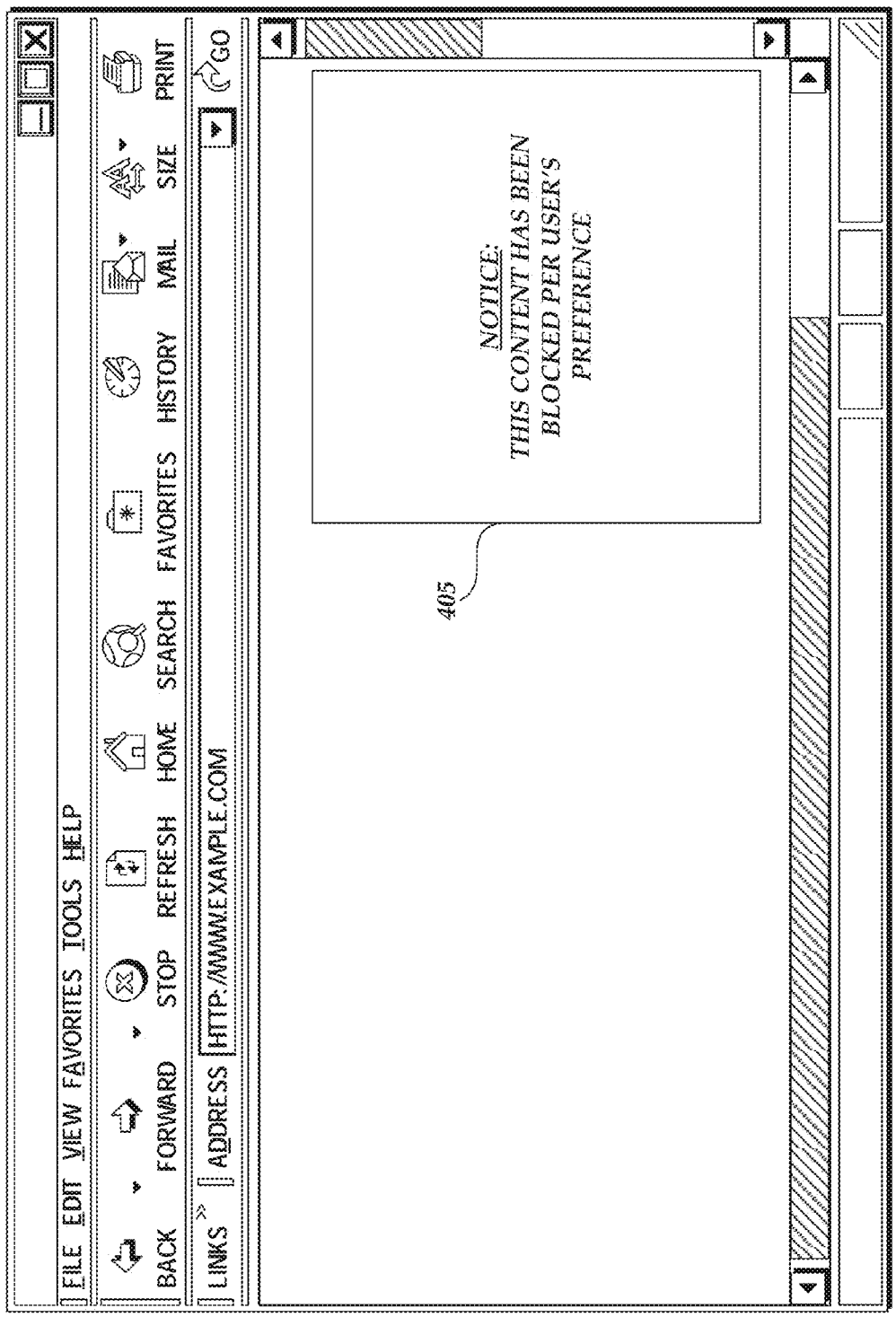
FIG. 4 illustrates an exemplary web browser view generated by an embodiment of the GBNC system.

In one embodiment, the networking device 105 may substitute other content for the undesired content, such as a different advertisement, status information and/or local information such as weather, etc. In one embodiment, the networking device 105 substitutes a placeholder or notice that the site has been blocked, as illustrated in FIG. 4. The user, viewing the notice on a paired, touch-enabled computing device with configuration setting access (e.g., the first computing device 110), can then make another unique gesture (e.g., an "O" or check mark) on the placeholder or notice to unblock access to that content. Upon receiving the input, the first computing device can then communicate with the networking device 105 to remove the URL associated with that content from the appropriate configuration setting, thereby unblocking access to that URL.

Figure 2:
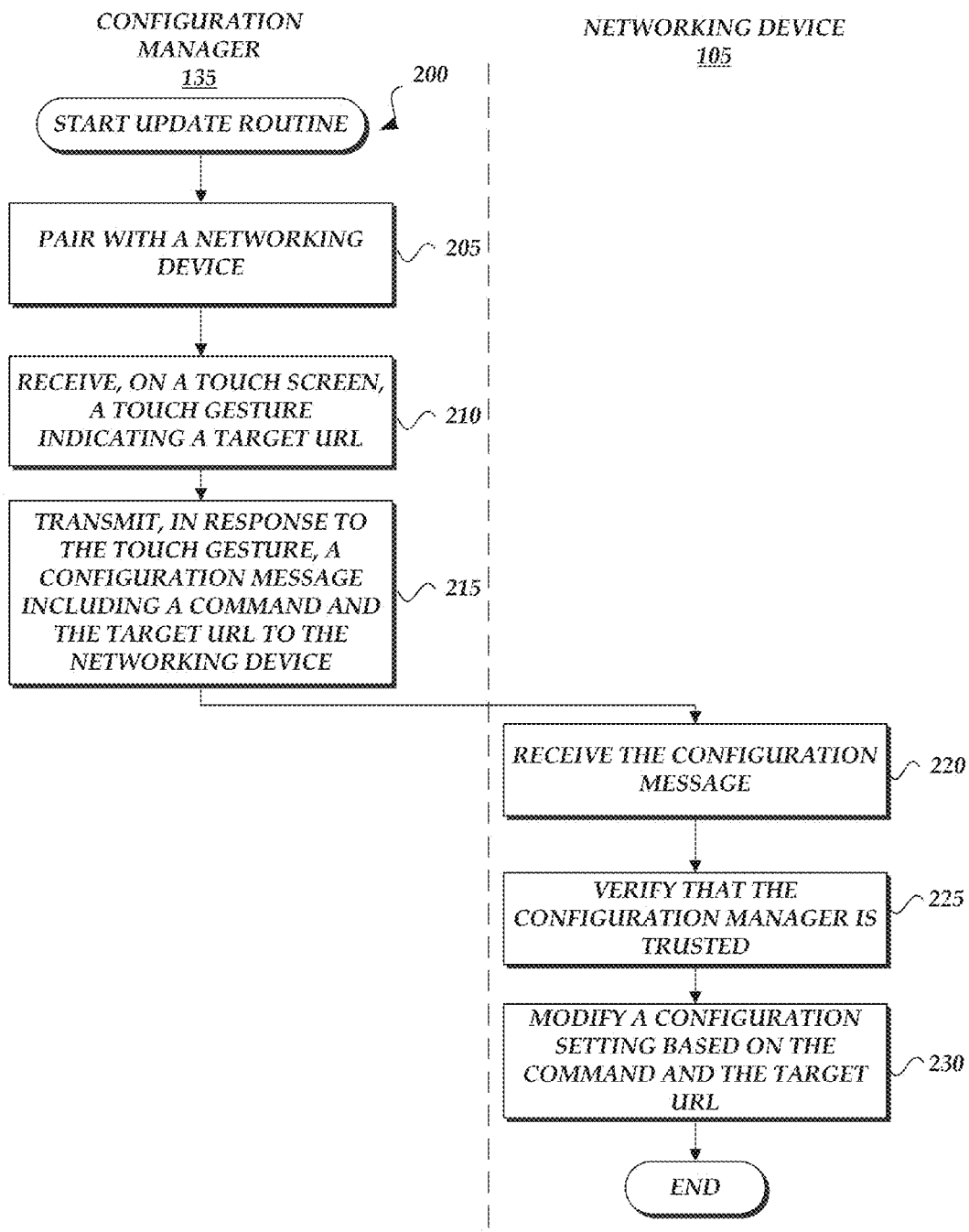
FIG. 2 illustrates a flow chart of an embodiment of an update routine for updating configuration settings of a networking device.

FIG. 2 illustrates a flow chart of an embodiment of an update routine 200 for updating configuration settings of a networking device. In some implementations, the routine 200 is performed by embodiments of the gesture based network configuration 100 described with reference to FIG. 1 or by one of its components, such as the first computing device 110 (also referred to herein as computing device 110), networking device 105, authentication module 120 and/or the configuration manager 135. For ease of explanation, the following describes the routine 200 as performed by the configuration manager 135 and the networking device 105. The routine is discussed in the context of an example scenario that is intended to illustrate, but not to limit, various aspects of the GBNC system 100.

Starting at block 205, the configuration manager 135 pairs with a networking device 105. Pairing can involve the computing device 110 connecting to the networking device 105 using a communication protocol (e.g., Wi-Fi, Ethernet or the like) and/or performing an authentication process with the networking device. For example, the configuration manager 135 may prompt the user to input authentication data that may be required by the networking device 105, such as security keys (e.g., for wireless encryption) and/or login and password information. The configuration manager 135 can then store the authentication data (e.g., on memory of the computing device 110) to allow the configuration manager to automatically access the router in the future, without requiring the user to re-enter the authentication data. In a sense, future interactions between the configuration manager 135 and networking device 105 are pre-authenticated, in some embodiments. In one embodiment, the pre-authentication may be for a limited amount of time or limited number of transactions, such that after the time or number passes, the user is again prompted to enter in authentication data.

At block 210, the computing device 110 receives a unique gesture on a touch screen 130 for content displayed on the screen. The configuration manager 135 recognizes the unique gesture and identifies a URL associated with the content. For example, the content can be a website and the URL is the website's URL. In another example, the content can be an advertisement or other link on a currently displayed website and the URL is the source of the advertisement or the destination of a link associated with the content.

At block 215, the configuration manager 135 transmits, in response to the touch gesture, a configuration message including a command and the target URL to the networking device. The command can depend on the unique gesture, and depending on the command, various modifications to one or more configuration settings on the networking device 105 may be performed. For example, a first unique gesture (e.g., an "X") may be associated with blocking access to the URL, a second unique gesture (e.g., an "O") may be associated with removing the URL from the block list, and/or a third unique gesture (e.g., a check) may be associated with setting a transmission priority for the target URL. In one embodiment, the configuration manager 135 transmits the command to the network address (e.g., IP or MAC address) of the networking device 105, either through a wired or wireless connection.

At block 220, the networking device 105 receives the configuration message. The configuration message may be sent using various types of connections and using various types of protocols.

At block 225, the networking device 105 (or, specifically, a process or application operating on the networking device, such as the authentication module 120), verifies that the configuration manager 135 is trusted. For example, the configuration manager 135 and/or the computing device 110 may have earlier paired with the networking device 105 to become pre-authenticated.

In one embodiment, the configuration message includes an authentication token (e.g., a security hash or key) to verify to the networking device 105 that the configuration manager 135 is authorized to make changes. In some embodiments, the configuration message includes login information (e.g., account and/or password) for accessing the configuration settings of the networking device 105. In one implementation, the networking device 105 may store identifying information for trusted devices and compare metadata associated with the configuration message or other identifying data sent with the configuration message to determine that the configuration manager is associated with a trusted device. For example, the networking device can obtain the IP and/or MAC address of the sending device and check that that device is stored in a database or other data repository as a trusted or authorized device.

At block 230, the networking device modifies a configuration setting based at least partly on the command and the target URL. In one embodiment, after determining the command is authorized, the networking device then processes the command and performs the desired operation, such as adding the target URL to a access block list, removing the target URL from the access block list, assigning a priority level to traffic from the URL, or modifying some other configuration setting. Depending on the command, the networking device may perform other functions. The routine 200 can then end.

FIGS. 3A-3D schematically illustrates embodiments of unique gestures that can be used by the GBNC system to initiate updates. FIG. 3A illustrates a computing device 110 in communication with a networking device 105. The user is inputting on a touch screen an example "X" gesture 305. The gesture can be made on the touch screen of the computing device 110 using a finger, touch pen or the like. FIG. 3B illustrates an example "check" gesture 310. FIG. 3C illustrates an example "O" gesture 315. FIG. 3D illustrates an alternative "X" gesture 320 that uses a single drawing stroke. By using a single drawing stroke, the touch screen may be better able to identify the gesture.

FIG. 4 illustrates an exemplary web browser view generated by an embodiment of the GBNC system. In one embodiment, the GBNC system modifies a web site being viewed by a user with a notice 405 indicating that content has been blocked. In some embodiments, the blocked content may be replaced with alternative content, as discussed above. In some embodiments, modifications to the website are be made by the networking device 105 or by the configuration manager 135.

Figure 5:
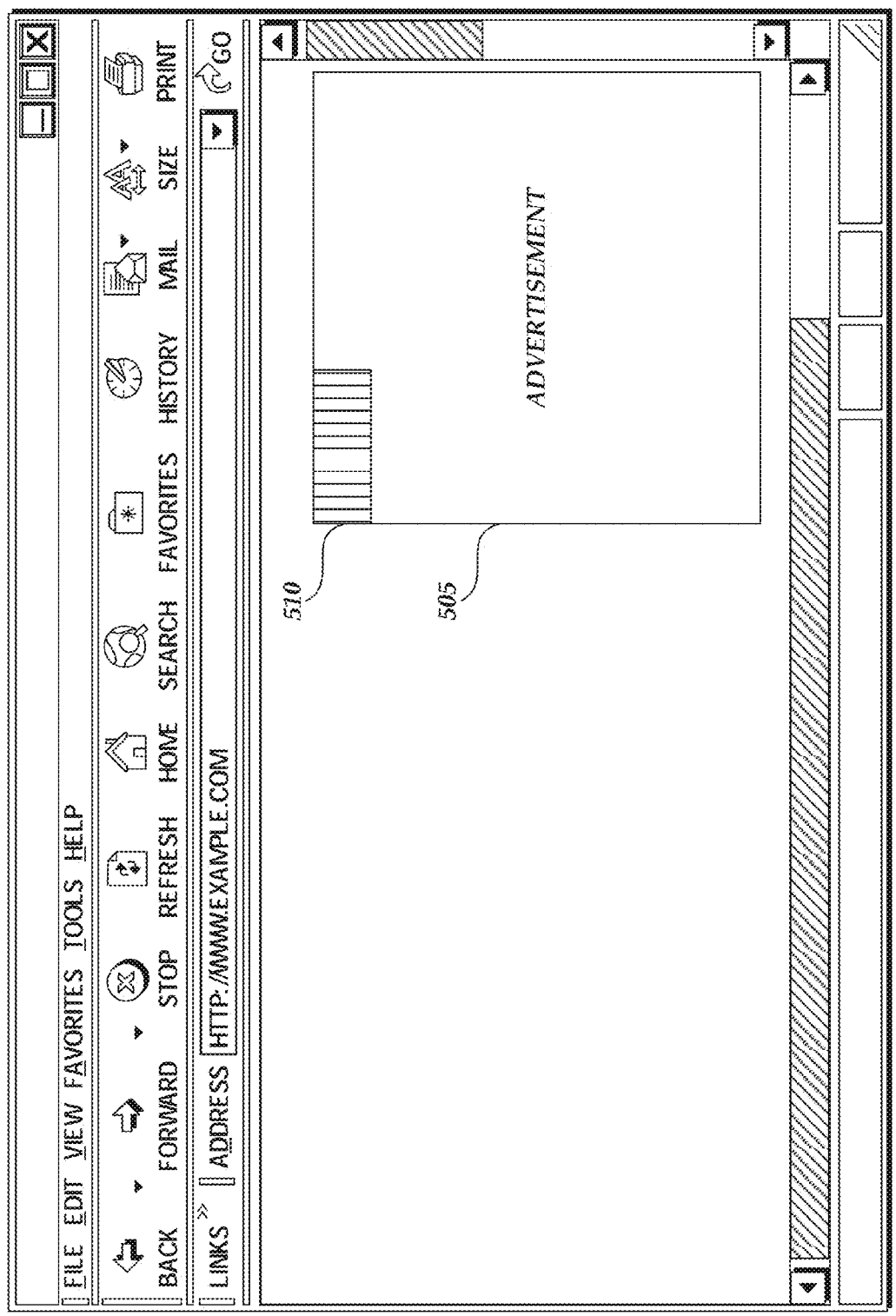
FIG. 5 illustrates another exemplary web browser view generated by an embodiment of the GBNC system.

FIG. 5 illustrates another exemplary web browser view generated by an embodiment of the GBNC system. In one embodiment, the GBNC system modifies an advertisement 505 (or other content) being viewed by a user by adding a control area 510 to the advertisement. When the user touches the control area, a particular command is triggered. Multiple control areas 510 can be added to the advertisement. For example, an control area on the top right can cause a URL associated with the content to be blocked, while a control area on the top left can cause the URL to be prioritized.

In one embodiment, the GBNC system may use multi-touch gestures to provide additional specificity to commands. For example, a user may touch content associated with a URL with one, two, three or more fingers to indicate a priority level for the content (e.g., low, medium and high priority). In one embodiment, the number of touch points corresponds to the priority level (e.g., more touch points results in higher priority or more touch points results in lower priority).

Many implementation variations are possible. As discussed above, the gesture-based network configuration system can be used to modify other behavior of a router or other network device in addition to blacklists. In one embodiment, the system is configured to add/remove URLs to a Quality of Service (QoS) configuration setting that affects routing priority on the LAN. For example, a user may be streaming video from a particular URL on a computing device and then perform a unique gesture on the device. An application (e.g., the configuration manager) operating on computing device may then interpret that gesture as an indication that the user wishes to prioritize traffic from that URL. The computing device can then communicate with the networking device to add that URL to the QoS configuration setting. The system can also be used to configure other network configuration settings, such as lists for pre-caching data. For example, a user who regularly visits particularly sites may wish to have the router pre-cache some sites. That user can use the GBNC system to add those sites to a caching configuration setting using gestures on a touch-enabled computing device.

In some embodiments, the above system may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

In some embodiments, the above system and its components are executed or embodied by one or more physical or virtual computing systems. For example, in some embodiments, a computing system, such as a server or mobile device, that has components including a central processing unit (CPU), input/output (I/O) components, storage and memory may be used to execute some or all of the components of the above system. The I/O components can include a display, a network connection to the network, a computer-readable media drive and other I/O devices (e.g., a keyboard, a mouse, a touch screen, speakers, etc.).

Each of the processes, methods and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A method for updating a configuration setting on a network router, the method comprising:
   pairing a computing device to a network router over a local area network (LAN), the network router being configured to store configuration settings identifying uniform resource locators (URLs) that are blocked by the network router;
   displaying web content associated with a first URL on a touch screen of the computing device using a web browser application;
   receiving a first touch gesture on the touch screen at least partially over the displayed web content; and
   in response to receiving the first touch gesture:
      automatically generating a configuration message directing the network router to modify the configuration settings to block the target first URL; and
      transmitting the configuration message to the network router over the LAN.

2. The method of claim 1, wherein pairing the computing device to the network router comprises:
   receiving authentication data for the network router; and
   storing the authentication data for the network router on the computing device.

3. The method of claim 2, further comprising transmitting the authentication data to the network router, wherein the network router is further configured to verify the computing device as a trusted device based at least partly on the authentication data.

4. The method of claim 1, further comprising:
   receiving a second touch gesture on the touch screen at least partially over the displayed web content; and
   in response to receiving the second touch gesture:
      automatically generating a second configuration message directing the network router to modify the configuration settings to allow the first URL; and
      transmitting the second configuration message to the network router over the LAN.

5. The method of claim 1, wherein the first touch gesture is an "X" mark.

6. The method of claim 1, wherein the first touch gesture is generated by a user manipulating the touch screen, and the configuration message is generated and transmitted without additional input from the user.

7. The method of claim 1, wherein the configuration settings indicate prioritization for one or more URLs.

8. The method of claim 1, further comprising receiving a multi-touch gesture on web content associated with a second URL, wherein a number of touch points of the multi-touch gesture indicates a priority level for the second URL.

9. The method of claim 1, wherein receiving the first touch gesture comprises:
   modifying the web content displayed on the touch screen by adding a gesture reception area; and
   receiving the first touch gesture on the gesture reception area.

10. A computing device configured to update configuration settings on a network router, the computing device comprising:
    a touch screen configured to receive touch gestures;
    memory for storing association data associating each of one or more touch gestures with one or more commands; and
    one or more processors configured to:
       pair the computing device to a network router over a local area network (LAN), the network router being configured to store configuration settings identifying uniform resource locators (URLs) that are blocked by the network router;
       display web content associated with a first URL on the touch screen using a web browser application;
       receive a first touch gesture on the touch screen at least partially over the displayed web content; and
       in response to receiving the first touch gesture:
          automatically generate a configuration message directing the network router to modify the configuration settings to block the first URL; and
          transmit the configuration message to the network router over the LAN.

11. The computing device of claim 10, wherein pairing the computing device to the network router comprises:
    receiving authentication data for the network router; and
    storing the authentication data for the network router on the computing device.

12. The computing device of claim 11, wherein the one or more processors are further configured to transmit the authentication data to the network router, and wherein the network router is further configured to verify the computing device as a trusted device based at least partly on the authentication data.

13. The computing device of claim 10, wherein the computing device is a tablet, smart phone or laptop.

14. The computing device of claim 10, wherein the first touch gesture is generated by a user manipulating the touch screen, and the configuration message is generated and transmitted without additional input from the user.

15. The computing device of claim 10, wherein the configuration settings indicate prioritization for one or more URLs.

16. The computing device of claim 10, wherein the one or more processors are further configured to receive a multi-touch gesture on web content associated with a second URL, wherein a number of touch points of the multi-touch gesture indicates a priority level for the second URL.

17. The computing device of claim 10, wherein receiving the first touch gesture comprises:
    modifying the web content item displayed on the touch screen by adding a gesture reception area; and
    receiving the first touch gesture on the gesture reception area.

18. Non-transitory computer-readable storage having stored thereon instructions that, when executed, direct a computing device to perform operations comprising:
    pairing the computing device to a network router over a local area network (LAN), the network router being configured to store configuration settings identifying uniform resource locators (URLs) that are blocked by the network router;

displaying web content associated with a first URL on a touch screen of the computing device using a web browser application;

receiving a first touch gesture on the touch screen at least partially over the displayed web content; and in response to receiving the first touch gesture:

automatically generating a configuration message directing the network router to modify the configuration settings to block the target first URL; and transmitting the configuration message to the network router over the LAN.

* * * * *